United States Patent [19]

Jockel et al.

[11] 4,331,449

[45] May 25, 1982

[54] PROCESS OF PRODUCING TOWN GAS FROM METHANOL

[75] Inventors: Heinz Jockel, Büttelborn; Friedrich W. Möller, Friedrichsdorf; Hans J. Renner; Gerd Siebert, both of Frankfurt am Main, all of Fed. Rep. of Germany

[73] Assignee: Metallgesellschaft Aktiengesellschaft, Frankfurt, Fed. Rep. of Germany

[21] Appl. No.: 186,865

[22] Filed: Sep. 12, 1980

Related U.S. Application Data

[63] Continuation of Ser. No. 15,377, Feb. 26, 1979, abandoned.

[30] Foreign Application Priority Data

Mar. 4, 1978 [DE] Fed. Rep. of Germany ....... 2809447

[51] Int. Cl.$^3$ ................................................ C01B 3/02
[52] U.S. Cl. .............................. 48/197 R; 48/214 A; 252/373
[58] Field of Search .................. 48/214 A, 197 R; 423/437, 648 R; 252/373, 466 R, 461; 585/373; 518/704, 707, 708, 711, 713, 715

[56] References Cited

U.S. PATENT DOCUMENTS

| | | | |
|---|---|---|---|
| 2,425,625 | 8/1947 | Larson | 423/648 R |
| 3,429,656 | 2/1969 | Taylor et al. | 423/437 |
| 3,507,811 | 4/1970 | Davies et al. | 48/214 A |
| 3,514,261 | 5/1970 | Bridger et al. | 48/437 |
| 3,515,514 | 6/1970 | Holmes et al. | 48/197 R |
| 3,961,037 | 6/1976 | Davies et al. | 423/437 |
| 4,028,067 | 6/1977 | Gent | 48/214 A |

OTHER PUBLICATIONS

Mahan, "University Chemistry," 1972, p. 544.

*Primary Examiner*—S. Leon Bashore
*Assistant Examiner*—Michael L. Goldman
*Attorney, Agent, or Firm*—Sprung, Horn, Kramer & Woods

[57] ABSTRACT

A process of producing a town-gas-grade fuel gas having a calorific value below 18,000 kJ/standard m$^3$ (4,300 kcal/standard m$^3$) by a catalytic reaction of methanol and water vapor under a pressure of 10 to 50 bars is disclosed wherein 80 to 95 percent of the mixed feedstock (methanol and water vapor) is fed in a water vapor to methanol weight ratio of 0.5 to 1.5 to a first reaction zone where it is maintained at a temperature of 300° to 700° C. in contact with a nickel catalyst containing 25 to 50 weight percent nickel, the remainder of the mixed feedstock being mixed with the effluent gas from the first reaction zone and together passed to a second reaction zone at a temperature of 200° to 400° C. and therein contacted with a copper catalyst containing 40 to 70 percent by weight copper.

5 Claims, 1 Drawing Figure

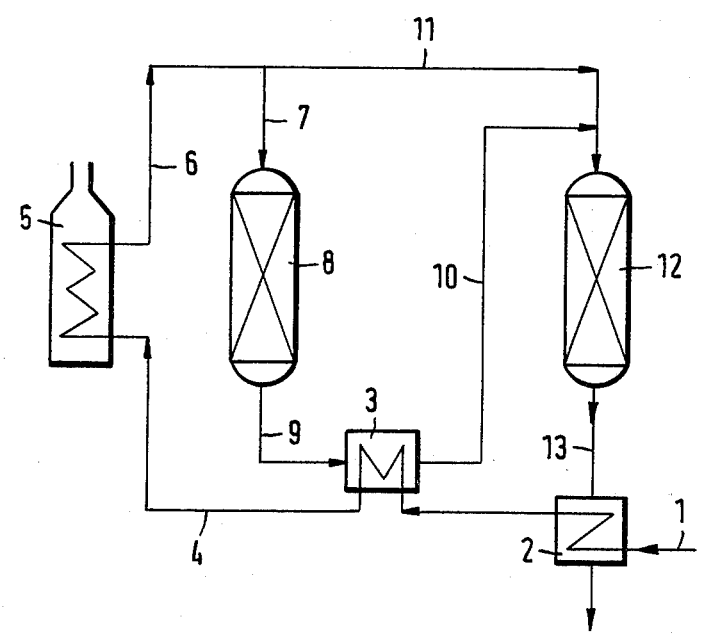

PROCESS OF PRODUCING TOWN GAS FROM METHANOL

This is a continuation, of application Ser. No. 015,377, filed Feb. 26, 1979 now abandoned.

BACKGROUND OF THE INVENTION

1. Field of the Invention

This invention relates to a process for producing a town-gas-grade fuel gas having a calorific value below 18,000 kJ/standard m$^3$ (4,300 kcal/standard m$^3$) by a catalytic reaction of methanol and water vapor under a pressure in the range of about 10 to 50 bars. More especially, this invention relates to such a process for producing a town-gas-grade fuel gas by a two step process wherein, in a first step a mixture of water vapor and methanol is reacted in a reaction zone containing a nickel catalyst, effluent from said reactor is admixed with additional methanol and water and the admixture is introduced into a second reaction zone containing a copper catalyst and therein reacted under a pressure of 10 to 50 bars absolute at a temperature of 200° to 400° C. More especially, this invention relates to a process of producing such a town-gas-grade fuel gas of lower calorific value without introducing diluent gases from extraneous sources.

CROSS REFERENCE TO RELATED APPLICATION

The invention herein is related to the invention described in copending application Ser. No. 826,802 now abandoned, filed Aug. 22, 1977, by Heinz Jockel et al., entitled PROCESS OF PRODUCING A FUEL GAS BY THE CATALYTIC REACTION OF METHANOL AND WATER VAPOR, assigned to the assignee hereof, the disclosure of which is hereby specifically incorporated herein by reference. Such copending application discloses the preparation of a town gas by reaction of methanol and water vapor over a nickel catalyst.

2. Discussion of the Prior Art

In spite of its high cost, methanol can be used as a sole starting material for producing town gas for supplying a base load. Methanol can well be used for the production of gas because it can be transported and stored in a simple manner. For this reason, it is preferably used in a gas supply system for supplying peak loads, e.g., in winter.

Methanol and water vapor can be catalytically reacted in contact with nickel catalysts to produce a high-methane gas, which usually has a high calorific value of or above 4300 kcal/standard m$^3$. If a town gas is required which has a lower calorific value, below 4300 kcal/standard m$^3$ (18,000 kJ/standard m$^3$), it is necessary to admix diluent gases, such as CO$_2$ or N$_2$, from extraneous sources. To the gas supply organization, this may involve considerable costs, which are unreasonably high in relation to the results. An admixing of inert gases such as CO$_2$ or N$_2$ also results in an undesirable increase in the density of the town gas.

It is an object of the invention to carry out the process mentioned first hereinbefore in such a manner that the desired town-gas-grade gas is produced in a technologically simple and commercially feasible manner and without the need for extraneous gas sources.

SUMMARY OF THE INVENTION

In accordance with the invention, the above-mentioned objects are accomplished by a process wherein about 80 to 95 percent of the mixed feedstock comprising water vapor and methanol in a weight ratio of about 0.5 to 1.5 are passed at temperatures of 300° to 700° C. through a first reaction zone containing a nickel catalyst, which nickel catalyst contains 25 to 50 percent by weight nickel as active component, the remainder of the mixed feedstock being passed together with effluent gas from the first reaction zone at temperatures of 200° to 400° C. through a second reaction zone, which reaction zone contains a copper catalyst, which copper catalyst contains about 40 to 70 percent by weight copper. By carrying out the town gas preparation in two steps employing different reaction zones containing different catalyst components, the town gas-grade-gas of calorific value below 18,000 kJ/standard m$^3$ is produced without introducing any diluent gas into the effluent from either the first or second reaction zones. Regulation of the calorific value is therefore achieved in a technologically simple and commercially feasible manner without requiring installation of a diluent gas supply means. Moreover, the town gas is produced without adversely affecting its density and without appreciably raising the cost of its production.

While not wishing to be bound by any theory, it is believed that under the action of the copper catalyst, substantially the following reactions take place in the second reaction zone:

$$CH_3OH + H_2O \rightarrow CO_2 + 3H_2$$

and $$CO + H_2O \rightarrow CO_2 + H_2$$

The product gas leaving the second reaction zone has a somewhat lower calorific value per standard m$^3$ than the effluent gas from the first reaction zone. This is mainly due to the selective reaction of methanol and water vapor to hydrogen and carbon dioxide. Because the composition of the gas is only gently changed in the second reaction zone, the calorific value desired for the town gas can be very exactly adjusted.

At least that part of the mixed feedstocks consisting of water and methanol which is to be passed through the first reaction zone is preferably mixed in a cold state and heated by a heat exchange to about 300° to 500° C. before said part enters the first reaction zone. The preparation of the mixed feedstocks from its components in a liquid state facilitates the handling of the mixed feedstocks during the subsequent heating and the feeding of the feedstocks to the catalytic reaction. The remainder of the feedstocks is passed only through the second reaction zone and may be taken from the mixed feedstocks which have been heated to about 300° to 500° C. Alternatively, said remainder of the mixed feedstocks may not be heated and may be injected in a cold state into the effluent gas from the first reaction zone so as to produce the mixed feedstocks for the second reaction zone.

The effluent gas from the first reaction zone is suitably cooled to temperatures of about 250° to 350° C. before it is mixed with the remainder of the mixed feedstocks. Cooling to higher temperatures will be sufficient if the remainder of the mixed feedstocks is added in a liquid state so that some heat of evaporation is extracted from the gas.

Nickel catalysts which are known per se for the reaction desired in the first reaction may be used in that zone.

The catalytic reaction of methanol and water vapor can be improved by the use of a special type of catalyst, which contains 25 to 50 percent nickel and about 5 to 40 percent high-alumina cement by weight. In addition to these main constituents, the support material of the catalyst can also contain zirconium dioxide and/or titanium dioxide. If the catalyst contains either of these oxides, its content will be at least 5 percent by weight.

It is to be understood that in carrying out the process, the feedstock itself contains water vapor and methanol in a weight ratio of 0.5 to 1.5, i.e., the feedstock to the first reaction zone and the feedstock which is admixed with the effluent from the first reaction zone and introduced into the second reaction zone comprises water vapor and methanol in such weight ratio. In each of the reaction zones, the gaseous components are maintained under a pressure of 10 to 50 bars (absolute). The first reaction zone is maintained at a temperature of 300° to 700° C., while the second reaction zone is maintained at a temperature of 200° to 400° C. The catalysts employed are usually employed in a reduced form, suitably in the form of elemental metal. The residence time of the gas in the first and second reaction zone is between 2 and 10 seconds. It is preferred to have a throughput of 1–5 kg of methanol per liter of catalyst and per hour for the first reaction zone and an output of 2–10 standard $m^3$ of wet gas per liter of catalyst and per hour from the second reaction zone.

A first embodiment of an advantageous nickel catalyst will now be described. That catalyst contains the compounds $Ni_5MgAl_2O_9$ and $ZrO_2$ in a weight ratio of 13:1 and also contains a high-alumina cement amounting to 30 percent of the total weight of the catalyst. The high-alumina cement has the following composition in percent by weight: 26.4 CaO, 71.9 $Al_2O_3$, 0.2 $Fe_2O_3$, 0.2 MgO, 0.4 $Na_2O$, 0.07 $SiO_2$ and traces of K, Cr, Cu, Mn, Ni and Pb. This first embodiment of the desirable catalyst is prepared as follows:

Solution II is added to suspension I within 15 minutes. The suspension and solution have the following compositions:

Suspension I
  1250 g sodium carbonate in 6 liters water which contains 37.5 g $ZrO_2$
Solution II
  250 g $Mg(NO_3)_2.6H_2O$
  1280 g $Ni(NO_3)_2.6H_2O$
  690 g $Al(NO_3)_3.9H_2O$
  in 6 liters water.

The resulting precipitate is filtered off, washed to be free from alkali, dried at 110° C. for 12 hours and then calcined at 400° C. for 4 hours. The resulting calcined material thus contains nickel oxide and also contains magnesium oxide, aluminum oxide and zirconium dioxide as support constituents. 350 g of the calcined material are mixed in a dry state with 150 g high-alumina cement. 60 g water are added to the mixture, which is then compacted to form tablets of 5×5 mm. These are shortly watered and in a moist state are stored in a closed system at 40° C. for 6 days for a complete setting. The resulting tablets have an end crushing strength of 464 kg/$cm^2$ and a bulk density of 1.57 kg/l. The nickel content, expressed as nickel oxide, is about 28.7 percent by weight. Before the catalyst is used, it is reduced. This may be accomplished by a treatment with hydrogen or other reducing gas.

A second embodiment of a suitable nickel catalyst contains the compounds $Ni_5MgAl_2O_9$, $ZrO_2$ and $\alpha$-$Al_2O_3$ in a weight ratio of 12:1:2 and also contains the high-alumina cement which has been explained hereinbefore and amounts to 15 percent of the total weight of the catalyst. The second catalyst is produced as follows:

Solutions I and II are continuously added to suspension III at a temperature of 60° C. in such a manner that the pH value of the solution does not drop below 8.5. The solutions and the suspension have the following compositions:

Solution I
  1250 g sodium carbonate in 6 liters water
Solution II
  255 g $Mg(NO_3)_2.6H_2O$
  1280 g $Ni(NO_3)_2.6H_2O$
  690 g $Al(NO_3)_3.6H_2O$
  in 6 liters water
Suspension III
  43.2 g zircondium dioxide and
  74.0 g $\alpha$-$Al_2O_3$
  in 3 liters water The resulting filter cake is filtered off and washed. The filter cake is dried at 110° C. for 12 hours and is subsequently calcined at 400° C. for 4 hours.

400 g of the resulting calcined material and 100 g high-alumina cement are mixed in a cold state. 150 g water are added to the mixture, which is then compacted to form tablets of 3×3 mm. The tablets are shortly watered and then treated at 110° C. for 12 hours. The resulting catalyst has an end crushing strength of 463 kg/$cm^2$ and a bulk density of 1.53 kg/l. The nickel content, expressed as the nickel oxide, is about 41.3 percent by weight. The catalyst is then reduced.

The copper catalyst used in the second reaction zone can be one prepared by precipitation, especially one to which zinc oxide and vanadium oxide have been added as promoters and stabilizers. The catalyst is usually reduced prior to use. It is desirable to use a copper catalyst which contains at least 10 percent by weight zinc. Such copper catalyst can be made, e.g., as follows:

1450 g $Cu(NO_3)_2.3H_2O$ and 890 g $Zn(NO_3)_2.6H_2O$ are dissolved in 18 liters water. 140 g $NaVO_3.H_2O$ and 900 g $Na_2CO_3$ are also dissolved in 18 liters water. The two solutions are heated to 80° to 90° C. The nitrate solution is then poured into the sodium carbonate and vanadate solution with vigorous stirring. The resulting precipitate is removed by filtration under a vacuum and is washed with a total of 100 liters of warm water, then dried at 110° C. and subsequently calcined at 300° C. for 5 hours and after an addition of 2 percent graphite is compacted to form tablets of 4×4 mm. After its oxides have been reduced, this catalyst contains about 60 percent copper, about 30 percent zinc and about 1 percent vanadium by weight. The vanadium content can generally be between 5 and 20 percent by weight.

BRIEF DESCRIPTION OF DRAWINGS

The appended drawing is a flow diagram of a particularly desirable mode of carrying out the invention. An example of the process will be explained with reference to the drawing.

DESCRIPTION OF SPECIFIC EMBODIMENT

Referring to the annexed drawing, a liquid mixture of methanol and water flows in conduit 1 through a heat exchanger 2 and then through another heat exchanger 3. The heated mixture is fed in conduit 4 to a fired heater 5 and leaves the same in the form of a vapor through conduit 6. 80 to 95 percent of these mixed feedstock vapors are fed via conduit 7 to the reactor 8, which contains a pile of bulk nickel catalyst that contains 25 to 50 percent nickel by weight as an active component. The effluent gas formed by the reaction of the mixed methanol and water vapors in contact with that catalyst contains methane, carbon oxides, and hydrogen as well as water vapor. If the reactor is operated adiabatically, the effluent gas in conduit 9 will have a higher temperature than the mixture entering the reactor 8.

The effluent gas flowing in conduit 9 delivers part of its heat in the heat exchanger 3 and leaves the latter in conduit 10 at a temperature of about 250° to 350° C. The remainder of the mixed feedstocks are fed in conduit 11 to said effluent gas. The resulting mixture is reacted in the reactor 12, which contains a copper catalyst that contains about 40 to 70 percent copper by weight. This copper catalyst may also constitute a fixed bed.

Town gas of the desired quality leaves the reactor 12 through conduit 13 and is cooled in the heat exchanger 2. The gas can subsequently be cooled further and dried in known manner. This is not shown on the drawing.

In order to more fully illustrate the nature of the invention and the manner of practicing the same, the following example is presented. Wherever pressures are stated, they are absolute pressures.

EXAMPLE

In an experimental plant of the kind diagrammatically depicted in the drawing, 10 kg methanol and 10 kg water are mixed per hour and under a pressure of 30 bars are preheated and evaporated in heat exchanger 2 and 3. The reaction mixture is superheated to 300° C. in the superheater 5 and is then divided into two streams 7 and 11.

90 percent of the reaction mixture passes through line 7 and is reacted in contact with a nickel catalyst in a shaft reactor 8, which is operated adiabatically. That catalyst contains the following components:

| | | |
|---|---|---|
| NiO | 36.9 percent by weight | (corresponding to 29.0 percent nickel by weight) |
| $Al_2O_3$ | 27.2 percent by weight | |
| MgO | 4.0 percent by weight | |
| CaO | 6.3 percent by weight | |
| $ZrO_2$ | 3.9 percent by weight | |
| Ignition loss | 21.7 percent by weight. | |

To activate this catalyst before its use, it is transformed to metal in a reducing atmosphere at elevated temperature.

The heat of reaction results in a temperature rise of the catalyst layer to 600° C. Most effluent gas is produced at a rate of 22.6 standard $m^3/h$ and has the following composition in percent by volume on a dry basis:

| | |
|---|---|
| $CO_2$ | 23.0 |
| CO | 2.7 |
| $H_2$ | 37.0 |
| $CH_4$ | 37.3 |

The moist gas also contains 1.26 $m^3$ $H_2O$ per $m^3$ of dry gas and has a calorific value of 4755 kcal (=19,900 kJ) per standard $m^3$ of dry gas. The unreacted remaining mixed methanol and water vapor feedstocks are fed in conduit 11 at a rate of 2.0 kg/h to said effluent gas when the latter has been cooled. The resulting reaction mixture is fed to the reactor 12.

In the adiabatically operated reactor 12, the reaction is effected in contact with a copper catalyst, which is made from the following components:

| | |
|---|---|
| CuO | 52.8 percent by weight |
| ZnO | 26.4 percent by weight |
| $V_2O_5$ | 8.8 percent by weight |
| Ignition loss | 12.0 percent by weight |

To activate this catalyst before its use, it is transformed to metal in a reducing atmosphere at elevated temperature.

Moist product gas is produced at a rate of 26.0 standard $m^3$ per hour and has the following composition in percent by volume on a dry basis:

| | |
|---|---|
| $CO_2$ | 24.9 |
| CO | 0.2 |
| $H_2$ | 46.3 |
| $CH_4$ | 28.6 |

The moist gas also contains 0.99 $m^2$ $H_2O$ per $m^3$ of dry gas.

Owing to the endothermic reaction by which methanol is decomposed, the exit temperature of the gas in conduit 13 is about 260° C.

The resulting town gas having a calorific value of 4136 kcal (17,310 kJ) per standard $m^3$ of dry gas is cooled to ambient temperature and may be dried, if desired.

We claim:

1. A process of producing a town-gas-grade fuel gas from methanol and water which comprises the steps of:
    A. Feeding 80 to 95% by weight of a mixed feedstock comprising water vapor and methanol in a weight ratio of 0.5 to 1.5 at a temperature of 300° to 700° C. to a first reaction zone containing a nickel catalyst with 25 to 50 weight percent nickel as the active component;
    B. withdrawing a gaseous effluent from said first reaction zone, said effluent consisting essentially of methane, water vapor, carbon oxides and hydrogen;
    C. cooling the effluent gas from the first reaction zone to a temperature of about 250° to 350° C. before it is mixed with the remainder of said mixed feedstock;
    D. to a second reaction zone feeding a mixture of said gaseous effluent together with the remainder of said mixed feedstock, the temperature of said gaseous effluent being fed to said second reaction zone being in the range of about 250° to 350° C., the temperature of said second reaction zone being 200° to 400° C., and in said second reaction zone contacting the mixture with a catalyst containing 40 to 70% by weight copper and 5 to 20% by weight vanadium;

E. from said reaction zone withdrawing a product gas containing methane, carbon oxides, hydrogen and water vapor, said product gas having a lower calorific value per standard cubic meter than said gaseous effluent from said first reaction zone; and F. cooling said product gas and employing the same as a town-gas-grade fuel gas having a calorific value below 18,000 kJ per standard cubic meter.

2. A process according to claim 1 wherein said town gas is produced without introducing any diluent gas into the effluent from either the first or second reaction zones.

3. A process according to claim 1 wherein at least a portion of the mixed feedstock comprising water vapor and methanol which is to be passed through the first reaction zone is mixed in a cold state and heated by heat exchange to about 300° to 500° C. before said portion enters the first reaction zone.

4. A process according to claim 1 wherein said nickel catalyst employed in the first reaction zone contains at least 5 percent by weight of a high-alumina cement and at least 5 percent by weight of zirconium dioxide or titanium dioxide.

5. A process according to claim 1 wherein the copper catalyst employed in the second reaction zone contains at least 10 percent by weight zinc.

* * * * *